＊＊＊＊＊

US005486090A

United States Patent [19]

Thompson et al.

[11] Patent Number: 5,486,090
[45] Date of Patent: Jan. 23, 1996

[54] TURBINE SHROUD SEGMENT WITH SERPENTINE COOLING CHANNELS

[75] Inventors: Ralph J. Thompson; Daniel E. Kane, both of Tolland, Conn.

[73] Assignee: United Technologies Corporation, Hartford, Conn.

[21] Appl. No.: 220,316

[22] Filed: Mar. 30, 1994

[51] Int. Cl.⁶ .................................................... F01D 25/12
[52] U.S. Cl. ........................................................ 415/173.1
[58] Field of Search ................................. 415/116, 173.1, 415/173.4, 174.4, 178

[56] References Cited

U.S. PATENT DOCUMENTS

| | | |
|---|---|---|
| 3,365,172 | 1/1968 | McDonough et al. . |
| 3,583,824 | 6/1971 | Smuland et al. . |
| 3,728,039 | 4/1973 | Plemmons et al. ............... 415/174.4 |
| 4,013,376 | 3/1977 | Bisson et al. . |
| 4,280,792 | 7/1981 | Hartel et al. ........................ 415/178 |
| 4,311,432 | 1/1982 | Kildea . |
| 4,573,865 | 3/1986 | Hsia et al. . |
| 4,573,866 | 3/1986 | Sandy, Jr. et al. . |
| 4,650,394 | 3/1987 | Weidner . |
| 4,650,395 | 3/1987 | Weidner . |
| 4,655,044 | 4/1987 | Dierberger et al. . |
| 4,752,184 | 6/1988 | Liang . |
| 4,759,687 | 7/1988 | Miraucourt et al. . |
| 4,992,025 | 2/1991 | Stroud et al. . |
| 5,088,888 | 2/1992 | Bobo . |
| 5,098,257 | 3/1992 | Hultgren et al. .................. 415/116 |
| 5,165,847 | 11/1992 | Proctor et al. . |
| 5,167,485 | 12/1992 | Starkweather . |
| 5,169,287 | 12/1992 | Proctor et al. . |
| 5,205,115 | 4/1993 | Plemmons et al. . |
| 5,219,268 | 6/1993 | Johnson . |
| 5,374,161 | 12/1994 | Kelch et al. ........................ 415/116 |
| 5,375,973 | 12/1994 | Sloop et al. ...................... 415/173.1 |

Primary Examiner—Edward K. Look
Assistant Examiner—James A. Larson
Attorney, Agent, or Firm—Gene D. Fleischhauer

[57] ABSTRACT

A turbine shroud segment for use in a gas turbine engine includes a serpentine channel along at least one axial edge of the segment. Various construction details are developed that disclose a channel for efficiently flowing cooling fluid through an axial edge of a shroud segment. In a particular embodiment, a turbine shroud segment includes a leading edge serpentine channel and a trailing edge serpentine channel. Both serpentine channels include ducts that extend to the serpentine channels from a point inward of adjacent retaining hooks. Cooling fluid flowing onto the outward surface of the segments flows through the ducts and along the serpentine channels to cool the leading and trailing edges of the segments.

18 Claims, 3 Drawing Sheets

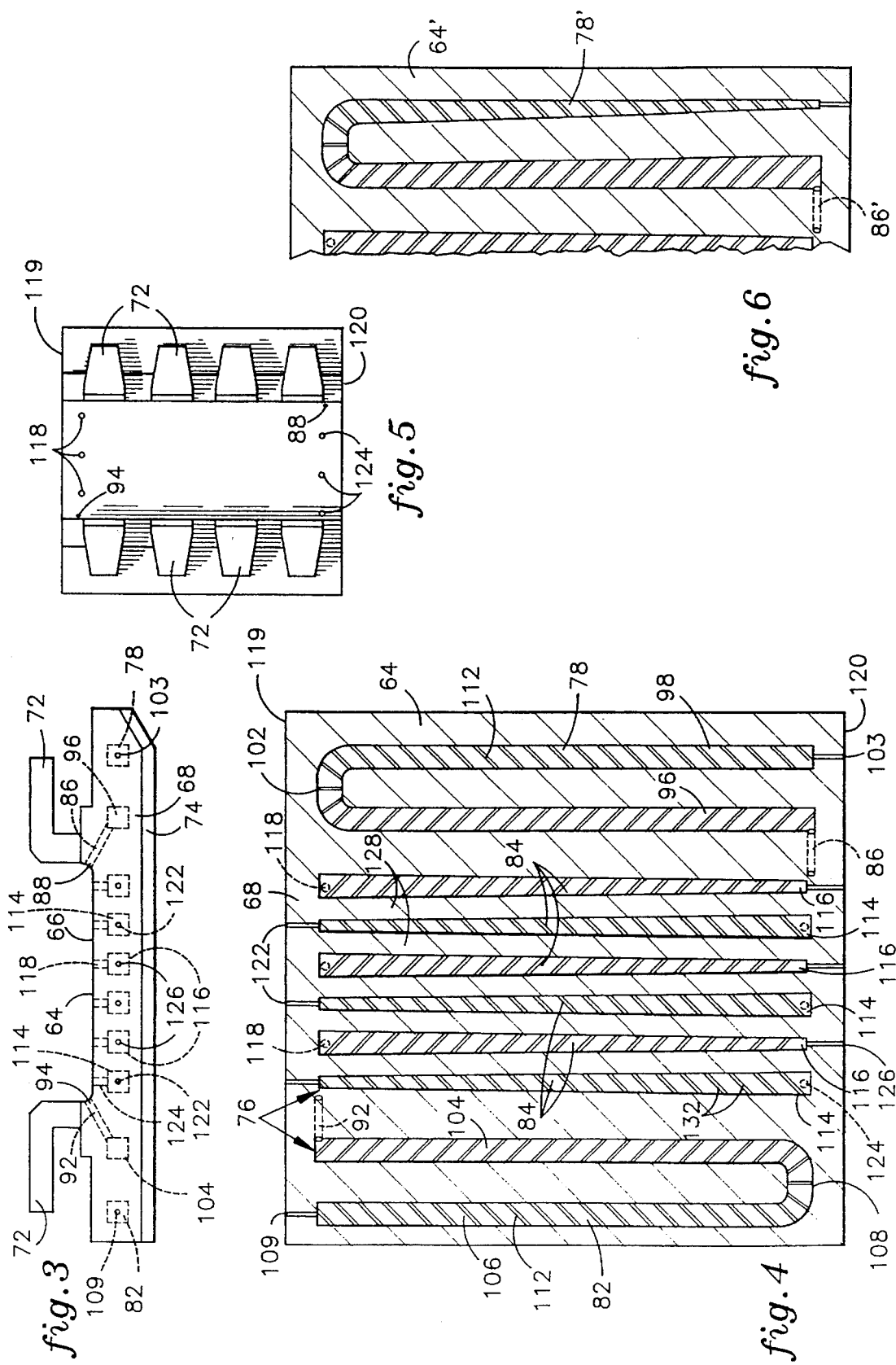

5,486,090

TURBINE SHROUD SEGMENT WITH SERPENTINE COOLING CHANNELS

TECHNICAL FIELD

This invention relates to gas turbine engines, and more specifically to turbine shroud segments for such engines.

BACKGROUND OF THE INVENTION

Axial flow gas turbine engines include a compressor, a combustor, and a turbine spaced sequentially along a longitudinal axis. An annular flow path extends axially through the compressor, combustor and turbine. The compressor includes an array of rotating blades that engage incoming working fluid to compress the working fluid. A portion of the compressed working fluid enters the combustor where it is mixed with fuel and ignited. The products of combustion or hot gases then flow through the turbine. The turbine includes alternating arrays of vanes and rotating blades. In the turbine, energy is transferred from the flowing hot gases to the turbine blades. A portion of this energy is then transferred back to the compressor section via a rotor shaft.

To optimize the efficiency of the interaction between the turbine blades and the hot gases flowing through the turbine, the hot gases are confined to an annular space by inner and outer turbine shrouds. The inner turbine shroud is typically a plurality of platforms integral to the blades. The platforms mate with platforms of adjacent blades to form an inner flow surface for the hot gases. The outer shroud is typically a ring-like assembly disposed radially outward of, but in close radial proximity to, the outer tips of the rotating blades. The outer shroud includes a plurality of arcuate segments spaced circumferentially to provide an outer flow surface for the hot gases.

Since the shroud segments are in direct contact with the hot gases, some form of cooling is required to maintain the shroud segments within acceptable temperature limits. Cooling methods have included impingement cooling, by injecting cooling fluid onto the radially outward or back side of the shroud segment, and film cooling, by forming cooling holes through the shroud segment that produce a film of cooling fluid over the flow surface of the shroud segment.

Although both impingement cooling and film cooling have proven adequate in most situations, advancements in gas turbine engines have resulted in higher temperature gases flowing through the turbine. This hotter working fluid has dictated the need for improved and more efficient cooling methods. One such recently developed method is disclosed in commonly assigned, pending U.S. patent application, Ser. No. 07/993,862, entitled "Turbine Blade Outer Air Seal With Optimized Cooling and Method of Fabrication". This application discloses cooling channels extending laterally through the shroud segment in a counter flow array. The channels include inlets in the back side of the shroud segment, exits ejecting cooling fluid into the inter-segment gap, and a taper in the direction of flow through the channels to control the Mach number of the fluid flowing through the channels.

A limitation to all the above arrangements is the ability to provide cooling fluid to the leading edge and trailing edge regions of the shroud segment. Each shroud segment includes retaining means adjacent the leading edge and trailing edge regions to retain the shroud segment into position within the stator structure. The retaining means are typically hooks or rails that extend laterally along the edges and radially outward from the back side of the shroud segment. The hooks and rails present an obstruction to flowing cooling fluid to this region to impinge upon the back side near the edges. Although film cooling passages may be angled to direct cooling fluid partially into these regions, forming film cooling passages at angles shallow enough to provide complete coverage is impractical. Finally, the hooks and rails prevent direct injection of cooling fluid into lateral channels under the hooks and rails and would require a cavity to extend from the back side, under the hooks and rails and over the leading edge and trailing edge regions. The latter would extend the hooks and rails further outward from the shroud segments, adding weight and stiffness to the shroud segments.

The above art notwithstanding, scientists and engineers under the direction of Applicants' Assignee are working to develop efficiently cooled turbine shroud segments for gas turbine engines.

DISCLOSURE OF THE INVENTION

According to the present invention, a turbine shroud segment includes a serpentine channel extending along at least one of the axial edges of the segment. The serpentine channel includes an inner passage, an outer passage and a duct. The outer passage is nearest the edge and is in fluid communication with the inner passage. The duct extends to the inner passage from an opening in the back side of the segment to permit cooling fluid to flow into and through the serpentine passage.

The feature of the serpentine channel results in convective cooling of the edge of the segment. Since this region of the segment is outward of a retaining means, such as a hook or rail, the typical methods of impingement cooling and/or film cooling are not available to this region. The retaining means presents an obstruction to getting cooling fluid into this region. The duct provides means to flow cooling fluid into the serpentine channel, which flows through the serpentine channel to the edge before exiting.

According to a specific embodiment of the present invention, the shroud segment includes the serpentine channel along the leading edge, a second serpentine channel along the trailing edge, and a plurality of lateral channels. The shroud segment includes a forward retaining means and an aft retaining means, the two retaining means extending from the back side and being axially spaced. The first serpentine channel is forward of the forward retaining means such that the duct extends to the inner passage from a point aft of the forward retaining means. The second serpentine channel is aft of the aft retaining means such that its duct extends to the second inner passage from a point forward of the aft retaining means. The lateral channels include a first set of channels having inlets along a lateral edge of the segment and exits in the opposite lateral edge and a second set of channels having inlets and exits reversed relative to the first set of channels. Each of the first set of channels is adjacent to one of the second set of channels such that cooling fluid flowing through each of the lateral channels is flowing in direction counter to that of the cooling fluid flowing in an adjacent channel.

The combination of the leading edge and trailing edge channels along with the plurality of counter flowing lateral channels results in minimizing hot spots in the shroud segment. The lateral channels provide maximum cooling availability to the blade passing region of the shroud segment. This region is exposed to the highest heat load as a result of the parabolic temperature profile of the working fluid entering the turbine and the radially outward pumping of this working fluid by the rotor blades. The serpentine channels provide convective cooling to the leading edge and trailing edge regions where, although the heat loads may be lower, the availability of impingement cooling or convective cooling from film cooling holes is impractical. As a result, convective cooling is available along the entire axial extent of the shroud segment.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 3 is a side view of a shroud segment, with the dashed lines representing cooling channels.

FIG. 4 is sectioned top view of the shroud segment, cut away to show the serpentine passages and the lateral passages.

FIG. 5 is a top view of the shroud segment showing the inlets for the cooling channels.

FIG. 6 is a top view of a portion of the shroud segment showing a serpentine channel that tapers in the downstream direction.

BEST MODE FOR CARRYING OUT THE INVENTION

Figure 1:
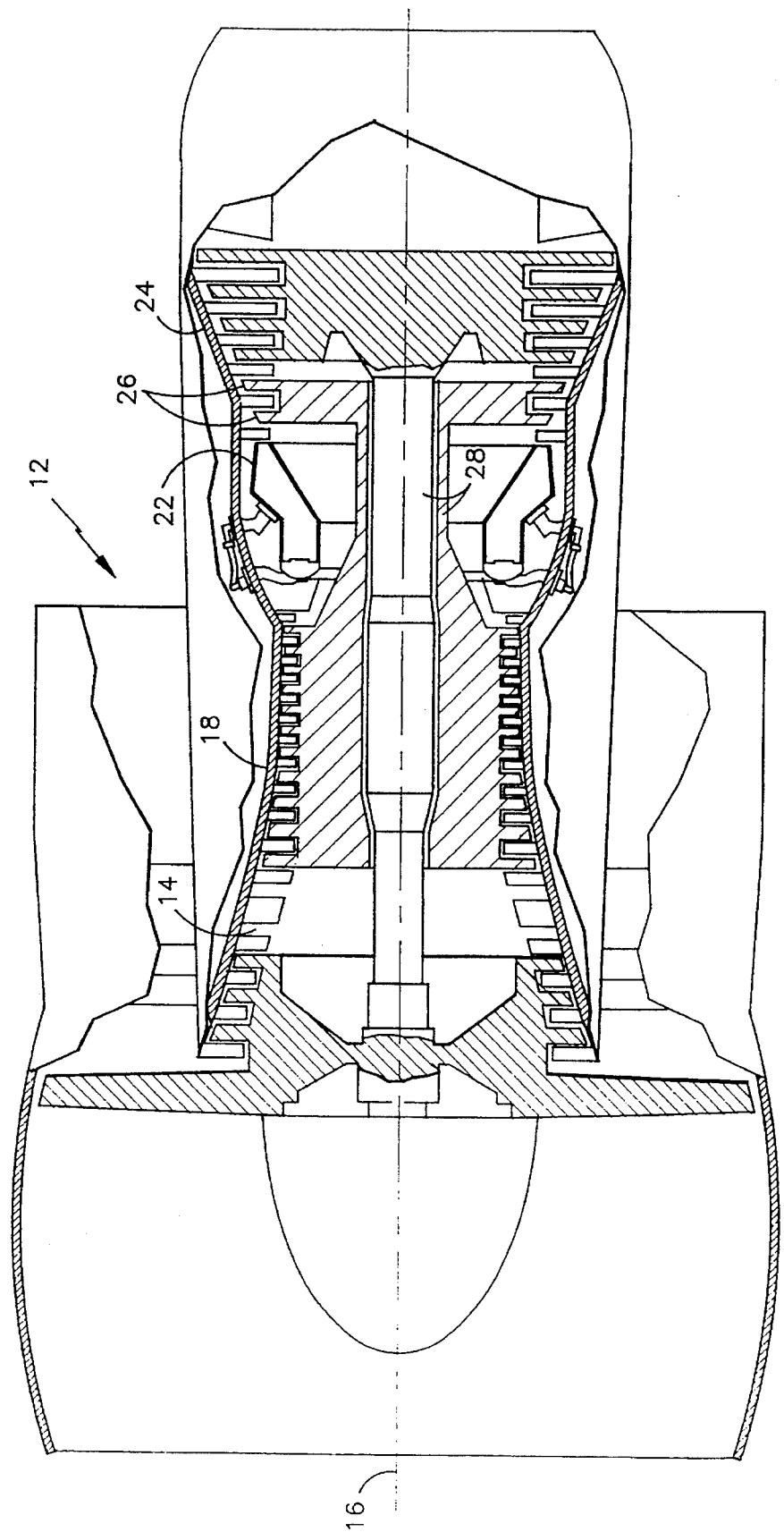
FIG. 1 is a side view, partially cut away, of a gas turbine engine.

A gas turbine engine 12 is illustrated in FIG. 1. The gas turbine engine 12 includes an annular flow path 14 disposed about a longitudinal axis 16. A compressor 18, combustor 22 and turbine 24 are spaced along the axis with the flow path 14 extending sequentially through each of them. The turbine 24 includes a plurality of rotor assemblies 26 that engage working fluid flowing through the flow path 14 to transfer energy from the flowing working fluid to the rotor assemblies 26. A portion of this energy is transferred back to the compressor 18, via a pair of rotating shafts 28 interconnecting the turbine 24 and compressor 18, to provide energy to compress working fluid entering the compressor 18.

Figure 2:
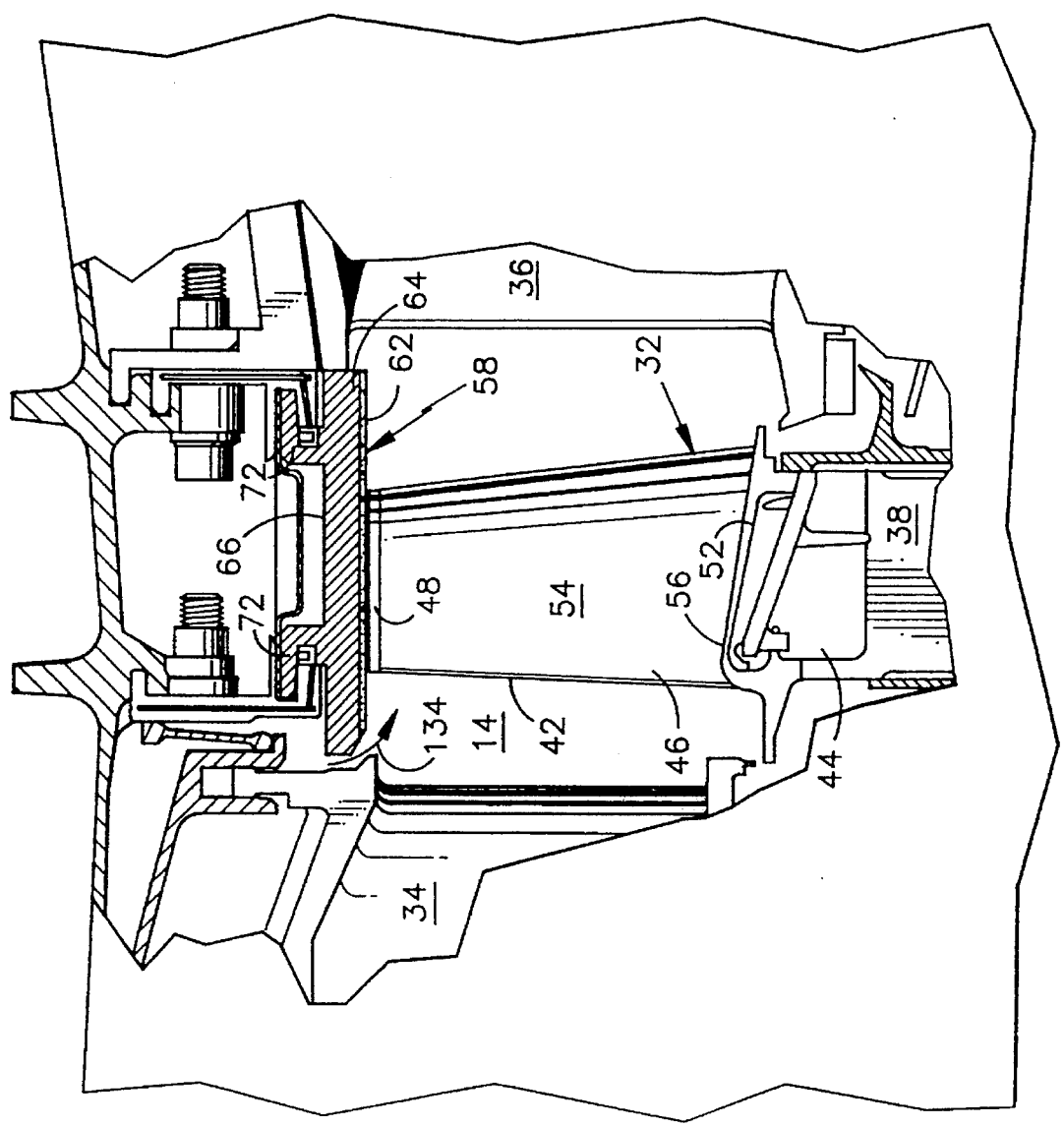
FIG. 2 is a side view of a turbine having stator assembly including a turbine shroud assembly.

Referring now to FIG. 2, a rotor assembly 32 is axially positioned between an upstream vane assembly 34 and a downstream vane assembly 36. The rotor assembly 32 includes a rotating disk 38 having a plurality of rotor blades 42 extending radially therefrom. Each of the rotating blades 42 includes a root portion 44, an airfoil portion 46 having a tip 48, and an inner platform 52. The root portion 44 retains the blade 42 to the disk 38 during rotation of the rotor assembly 32. The airfoil portion 46 extends radially through the flow path 14 and provides a flow surface 54 to engage the working fluid flowing through the turbine 24. The inner platform 52 extends laterally from the blade 42 and mates with the platforms of circumferentially adjacent blades to define a radially inner flow surface 56. The radially inner flow surface 56 urges the flowing working fluid to flow over the surface 54 of the airfoil portion 46.

A turbine shroud 58 extends circumferentially about and radially outward of the rotor assembly 32. The tips 48 of the rotating blades 42 are in close radial proximity to a radially outer flow surface 62 defined by the turbine shroud 58. The flow surface 62 discourages the working fluid from flowing radially outward and urges the working fluid to flow over the flow surface 54 of the airfoil portion 46. The flow surface 62 of the turbine shroud 58 and the flow surface 56 of the platforms 52 in conjunction confine the working fluid into an annular passage through which the blades 42 extend to optimize engagement between the working fluid and rotating blades 42.

The turbine shroud 58 includes a plurality of shroud segments 64 spaced circumferentially about the flow path 14 and means to flow cooling fluid onto the outward surfaces 66 of the segments 64. As shown in FIGS. 3 to 5, each shroud segment 64 includes a substrate 68 having a plurality of hooks 72 and a coating layer 74. The hooks 72 provide means to retain the shroud segment 64 to the adjacent structure of the turbine shroud 58. The coating layer 74 is a combination of a thermal barrier coating, to insulate the segment from the hot gases flowing through the turbine, and an abradable coating, to engage the tips of the rotor blades during rotation of the rotor assembly.

Each segment 64 includes a plurality of cooling channels 76 extending through the substrate 68. The plurality of channels 76 includes a serpentine channel 78 along the leading edge of the segment 64, another serpentine channel 82 along the trailing edge of the segment 64, and a plurality of lateral channels 84 therebetween. The serpentine channel 78 is in fluid communication with the outward surface of the segment 64 via a duct 86 having an inlet 88 in the outward surface. The inlet 88 is located immediately inward of the leading edge hooks 72 such that the duct 86 extends under the hooks 72. The duct 86 provides a convenient mechanism to flow cooling fluid into the serpentine channel 78 without disrupting the sealing along the leading edge and without extending the hooks 72 outward from the substrate 68 as would be necessary if a cavity was extended under the hooks 72. The trailing edge serpentine channel 82 is similar to the leading edge serpentine channel 78 and includes a duct 92 having an inlet 94.

The serpentine channel 78 includes a first passage 96, a second passage 98 outward of the first passage 96, a bend 102 interconnecting the two passages 96,98, and an exit 103. The serpentine channel 82 along the trailing edge is similar to serpentine channel 78 in that it includes a first passage 104, a second passage 106, a bend 108 interconnecting the two passages 104, 106, and an exit 109. Both of the serpentine channels 78,82 include trip strips 112 distributed throughout the lengths of the channels 78,82. The trip strips 102 provide means to disturb the flow and produce regenerative turbulent flow through the channels 78,82 to increase heat transfer between the substrate 68 and the fluid flowing within the channels 78,82.

The lateral channels 84 extend laterally between the pairs of hooks 72 and include a first set of lateral channels 114 and a second set of lateral channels 116. The first set of lateral channels 114 have inlets 124 in the outward surface located along one lateral edge 120 of the segment 64 and exits 122 in the opposite lateral edge 119 of the segment 64. The second set of lateral channels 116 include inlets 118 in the outward surface located along lateral edge 119 and exits 126 located in the opposite lateral edge 120. The first set 114 and second set 116 are interposed with each other such that each lateral channel 84 shares a common divider wall 128 with one of the lateral channels 84 of the other set. As with the serpentine channels 78,82, the lateral channels include trip strips 132 distributed along the lengths of the channels 84 to produce a regenerative flow within the lateral channels 84. In addition, the lateral channels 84 taper from the inlet end to the exit end to control the Reynolds number of the fluid flow within the lateral channels 84. Increasing the Reynolds number also increases the heat transfer between the substrate and the fluid flowing within the channel.

Although the serpentine channels are shown as having generally constant area cross sections, the use of tapered channels to control the Reynolds number of the fluid flowing within the serpentine channels may be used. In current applications, however, it is not thought to be necessary to control the Reynolds number within the channels along the leading and trailing edge of the segments. Some applications may require this feature, illustrated in FIG. 6, to maximize the heat transfer from the substrate in the region of the leading edge or trailing edge. As shown in FIG. 6, a segment 64' includes a serpentine channel 78' that tapers from the end having a duct 86' to the opposite end.

During operation, cooling fluid flows through the stator assembly and impinges upon the outward surface of the segments 64. At least a portion of this cooling fluid then flows through the inlets 88,94 of the serpentine channels 78,82 and the inlets 118,124 of the lateral channels 84. The cooling fluid flowing through inlet 88 flows through the duct 86 and into the first serpentine channel 78. This cooling fluid engages the trip strips 112 as it flows through the first passage 96, around the bend 102, and through the second passage 98. The cooling fluid exits the second passage 98 through the exit 103. Fluid exiting the second passage 98 flows into the gap between adjacent segments 64, i.e. the inter-segment gap, to purge this gap of the hot gases that may have flowed into the gap. Cooling fluid flowing into inlet 94 flows through the duct 92 and through serpentine channel 82 along the trailing edge in much the same fashion and exits into the inter-segment gap along the opposite lateral edge 119 of the segment 64.

Another portion of the cooling fluid flows into the inlets 118, 124 and flows through the lateral channels 84. Since each of the first set of lateral channels 114 is adjacent to one of the second set of lateral channels 116, the cooling fluid flows in counter directions in adjacent lateral channels 84. The cooling fluid engages the trip strips 132 to produce a regenerative turbulent flow and, as a result of the taper, the Reynolds number of the fluid flow is controlled through the lateral channels 84. Cooling fluid exits the lateral channels 84 through the exits 122,126 and into the inter-segment gaps on either side of the segment 64 to purge the inter-segment gaps of gas path fluid.

Distributing the channels 78,82,84 through the substrate 68, including into the leading edge and trailing edge regions, results in minimizing the occurrence of hot spots in the substrate 64. In addition, the inter-segment purge of the fluid exiting the exits 103,109,122,126 reduces the likelihood of hot gases flowing into or remaining within the inter-segment gap to cause damage to the lateral edges 119,120 of the segments 64.

Having such serpentine channels 78,82 efficiently utilizes the cooling fluid directed into the leading edge and trailing edge regions of the substrate 64. These areas are under lower heat loads, relative to the blade passing region of the segment 64, as a result of the blade pumping effect of the rotating blades 42. Blade pumping urges working fluid to flow outward and onto the segment 64 in the blade passing region. Although the leading edge is upstream of the blades 42 and is in an area of the flow path 14 having gas path fluid with the highest temperature, cooling fluid leaking around the leading edge of the segments 64 produces a film of cooling fluid over the leading edge region (as shown by arrow 134 in FIG. 2). The trailing edge region is downstream of the rotating blades 42 and is exposed to gas path fluid that has had energy removed from it by the rotating blades 42. Therefore, the leading edge and trailing edge regions require less cooling than the blade passing region of the segment 64, and the serpentine channels 78,82, which efficiently utilize cooling fluid, may be used in these regions.

The segments 64 may be fabricated by casting. This procedure includes the steps of forming a core to represent the channels 78,82,84 and casting the substrate 68 about the core. After the casting step is complete, the casting holes, present along the lateral edges as a result of the core supports used to hold the channel cores during casting, may be filled, except for those to be used as exits. The inlets 88,94,118,124 and ducts 86,92 are formed in the outward surface in a conventional fashion, such as by electric discharge machining. The hooks 72 and seal lands are machined onto the substrate 68 and the coating layer 74 is then applied to the flow surface.

Although the invention has been shown and described with respect with exemplary embodiments thereof, it should be understood by those skilled in the art that various changes, omissions, and additions may be made thereto, without departing from the spirit and scope of the invention.

What is claimed is:

1. A shroud segment for a gas turbine engine having an annular flow path disposed about a longitudinal axis, a rotor assembly having a plurality of rotor blades extending radially through the flow path, and a shroud assembly including a plurality of the shroud segments being spaced circumferentially to define a flow surface radially outward of the rotor blades to bound a portion of the flow path, and means to inject cooling fluid onto the plurality of shroud segments, the shroud segment including a first surface, a back side disposed oppositely of the first surface, a pair of axial edges defining a leading edge and a trailing edge, first retaining means adjacent the leading edge and extending from the back side, second retaining means adjacent the trailing edge and extending from the back side, and a serpentine channel including an outer passage extending along one of the edges and outward of the retaining means extending adjacent that edge, an inner passage being inward of the outer passage and in fluid communication with the outer passage, and a duct extending to the inner passage from a location inward of the adjacent retaining means, the duct permitting fluid communication between the back side of the shroud segment and the serpentine channel such that a portion of the cooling fluid injected onto the back side flows through the serpentine channel.

2. The shroud segment according to claim 1, wherein the serpentine channel includes an exit disposed along a lateral edge of the segment, the exit extending between and providing fluid communication between the lateral edge and the outer passage.

3. The shroud segment according to claim 1, further including a second serpentine channel including an outer passage extending along the opposite edge and outward of the retaining means extending adjacent that edge, an inner passage being inward of the outer passage, and a duct extending to the inner passage from a location inward of the adjacent retaining means, the duct permitting fluid communication between the back side of the shroud segment and the second serpentine channel such that a portion of the cooling fluid injected onto the back side flows through the second serpentine channel.

4. The shroud segment according to claim 1, further including a plurality of lateral channels extending laterally through the segment, the plurality of lateral channels located inward of the first and second retaining means, each of the lateral channels separated from an adjacent lateral channel by a wall therebetween, each of the lateral channels having an inlet disposed in the back side of the shroud segment and an exit disposed in a lateral edge of the segment, the inlet permitting fluid communication between the back side of the shroud segment and the lateral channels such that a portion of the cooling fluid injected onto the back side flows through the lateral channels and exits the lateral channels along the lateral edge of the shroud segment.

5. The shroud segment according to claim 4, wherein the plurality of lateral channels includes a first set of lateral channels and a second set of lateral channels, the first set of lateral channels having inlets along the first lateral edge and exits in the opposite lateral edge, the second set of lateral channels having inlets along the opposite lateral edge and exits in the first lateral edge, wherein each of the first set of lateral channels is adjacent to one of the second set of lateral channels such that cooling fluid flowing through each of the plurality of lateral channels is flowing in a direction counter to that of the lateral channel adjacent to it.

6. The shroud segment according to claim 5, further including a second serpentine channel including an outer passage extending along the opposite edge and outward of the retaining means extending adjacent that edge, an inner passage being inward of the outer passage, and a duct extending to the inner passage from a location inward of the adjacent retaining means, the duct permitting fluid communication between the back side of the shroud segment and the second serpentine channel such that a portion of the cooling fluid injected onto the back side flows through the second serpentine channel.

7. The shroud segment according to claim 1, wherein the serpentine channel includes a plurality of trip strips distributed along the length of the serpentine channel.

8. The shroud segment according to claim 3, wherein the first serpentine channel and the second serpentine channel include a plurality of trip strips distributed along the lengths of the serpentine channels.

9. The shroud segment according to claim 6, wherein the serpentine channels and the plurality of lateral channels include a plurality of trip strips distributed along the length of the channels.

10. A shroud assembly for a gas turbine engine having an annular flow path disposed about a longitudinal axis, a rotor assembly having a plurality of rotor blades extending radially through the flow path, the shroud assembly including a plurality of shroud segments spaced circumferentially to define a flow surface radially outward of the rotor blades to bound a portion of the flow path, and means to inject cooling fluid onto the plurality of shroud segments, each of the shroud segments including a radially inward facing surface, a back side disposed oppositely of the radially inward facing surface, a pair of axial edges defining a leading edge and a trailing edge, first retaining means adjacent the leading edge and extending outward from the back side, second retaining means adjacent the trailing edge and extending outward from the back side, and a serpentine channel including an outer passage extending along one of the edges and outward of the retaining means extending adjacent that edge, an inner passage being inward of the outer passage, and in fluid communication with the outer passage, and a duct extending to the inner passage from a location inward of the adjacent retaining means, the duct permitting fluid communication between the back side of the shroud segment and the serpentine channel such that a portion of the cooling fluid injected onto the back side flows through the serpentine channel.

11. The shroud assembly according to claim 10, wherein adjacent shroud segments are circumferentially spaced to define an inter-segment gap, and wherein each of the serpentine channels includes an exit disposed along a lateral edge of the shroud segment, the exits extending between and providing fluid communication between the outer passages and the inter-segment gaps such that a portion of the fluid flowing through the serpentine channels exits into the inter-segment gaps.

12. The shroud assembly according to claim 10, wherein each of the segments further includes a second serpentine channel including an outer passage extending along the opposite edge and outward of the retaining means extending adjacent that edge, an inner passage being inward of the outer passage, and a duct extending to the inner passage from a location inward of the adjacent retaining means, the duct permitting fluid communication between the back side of the shroud segment and the second serpentine channel such that a portion of the cooling fluid injected onto the back side flows through the second serpentine channel.

13. The shroud assembly according to claim 10, wherein the plurality of shroud segments are circumferentially spaced to define inter-segment gaps, and wherein each of the segments includes a plurality of lateral channels extending laterally through the segment, the plurality of lateral channels located inward of the first and second retaining means, each of the lateral channels separated from an adjacent lateral channel by a wall therebetween, each of the channels having an inlet disposed in the back side of the shroud segment and an exit disposed in a lateral edge of the segment, the inlet permitting fluid communication between the back side of the shroud segment and the lateral channels such that a portion of the cooling fluid injected onto the back side flows through the lateral channels and exits the channels into the inter-segment gaps.

14. The shroud assembly according to claim 13, wherein each of the plurality of lateral channels includes a first set of lateral channels and a second set of lateral channels, the first set of lateral channels having inlets along the first lateral edge and exits in the opposite lateral edge, the second set of lateral channels having inlets along the opposite lateral edge and exits in the first lateral edge, wherein each of the first set of lateral channels is adjacent to one of the second set of lateral channels such that cooling fluid flowing through each of the plurality of lateral channels is flowing in a direction counter to that of the lateral channel adjacent to it.

15. The shroud assembly according to claim 14, wherein each of the segments further includes a second serpentine channel including an outer passage extending along the opposite edge and outward of the retaining means extending adjacent that edge, an inner passage being inward of the outer passage, and a duct extending to the inner passage from a location inward of the adjacent retaining means, the duct permitting fluid communication between the back side of the shroud segment and the second serpentine channel such that a portion of the cooling fluid injected onto the back side flows through the second serpentine channel.

16. The shroud assembly according to claim 10, wherein each of the serpentine channels include a plurality of trip strips distributed along the length of the serpentine channel.

17. The shroud assembly according to claim 12, wherein each of the first serpentine channels and each of the second serpentine channels includes a plurality of trip strips distributed along the lengths of the serpentine channels.

18. The segment according to claim 15, wherein each of the first serpentine channels, each of the second serpentine channels, and each of the plurality of lateral channels includes a plurality of trip strips distributed along the length of the channels.

* * * * *